United States Patent [19]

Roth et al.

[11] 4,119,749
[45] Oct. 10, 1978

[54] MOULDED LIGHT-WEIGHT FRAMED PANEL

[75] Inventors: Jacques Roth, Strasbourg; Michel Roth, Ostwald; Paul Seiler, Illkirch-Graffenstaden; Roger Lavenir, Strasbourg; Alain Manigold, Strasbourg-Koenigshoffen, all of France

[73] Assignee: Roth Freres, S.A., Strasbourg-Meinau, France

[21] Appl. No.: 817,921

[22] Filed: Jul. 21, 1977

Related U.S. Application Data

[62] Division of Ser. No. 650,983, Jan. 21, 1976, Pat. No. 4,059,660.

[30] Foreign Application Priority Data

Feb. 5, 1975 [FR] France .............................. 75 05064
Dec. 22, 1975 [FR] France .............................. 75 40180

[51] Int. Cl.² .......................... B32B 3/06; B32B 3/26
[52] U.S. Cl. ................................. 428/99; 296/137 A;
428/71; 428/77; 428/160; 428/315

[58] Field of Search ............... 428/311, 314, 315, 71, 428/77, 78, 79, 99, 157, 158, 160; 296/137 A

[56] References Cited

U.S. PATENT DOCUMENTS

| 3,647,588 | 3/1972 | Greig | 428/313 |
|---|---|---|---|
| 3,856,611 | 12/1974 | Markley | 428/310 |
| 3,867,240 | 2/1975 | Doerfling | 428/315 |
| 4,005,239 | 1/1977 | Davis et al. | 428/315 |
| 4,020,207 | 4/1977 | Alfter et al. | 428/315 |
| 4,042,751 | 8/1977 | Roth | 428/311 |

FOREIGN PATENT DOCUMENTS 1,132,634 11/1968 United Kingdom ............... 296/137 A

*Primary Examiner*—William J. Van Balen
*Attorney, Agent, or Firm*—Young & Thompson

[57] ABSTRACT

The disclosure is of a moulded light-weight panel and its manufacture, the panel comprising sheets of foamed material and cardboard, which may be corrugated, impregnated with a solution of elastomer which becomes polymerized to bond all the components of the panel together in a mould. Reinforcing and fastening elements may be incorporated in the panel.

3 Claims, 7 Drawing Figures

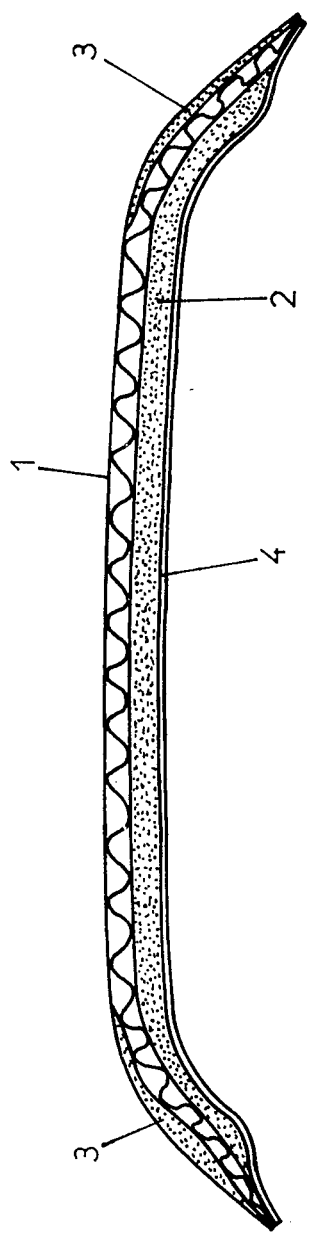
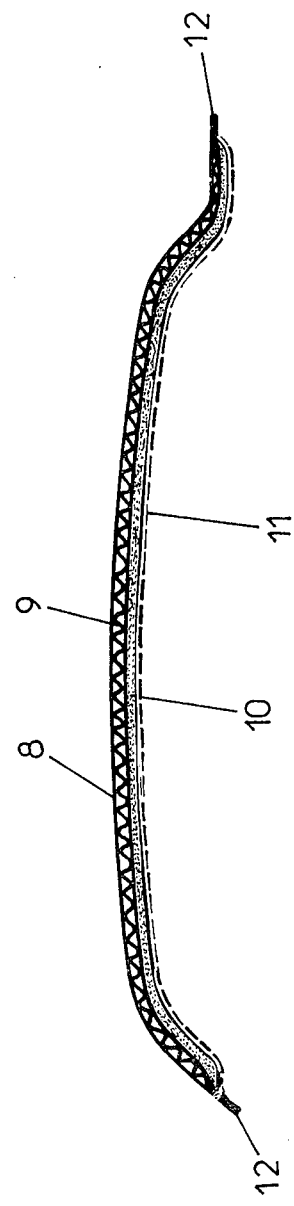

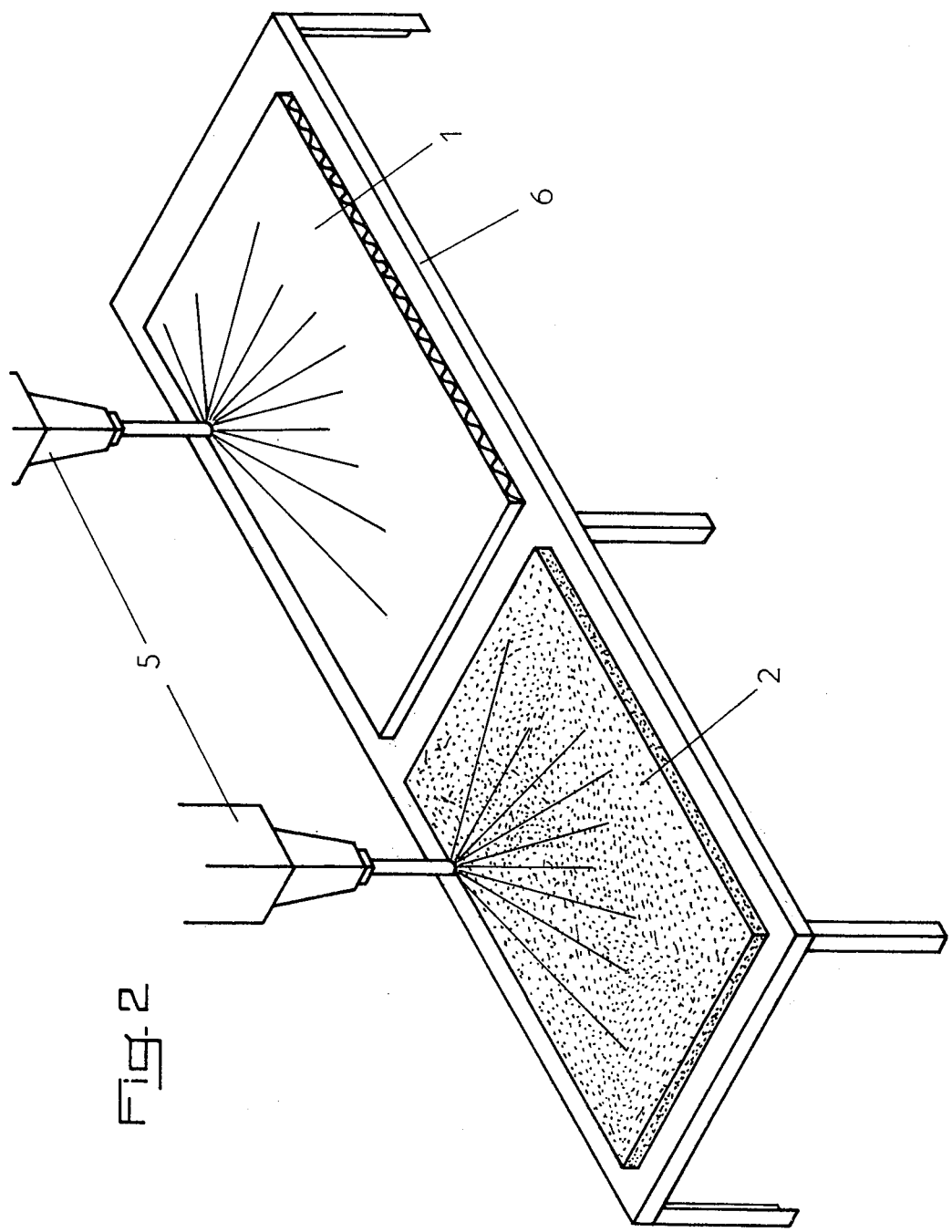

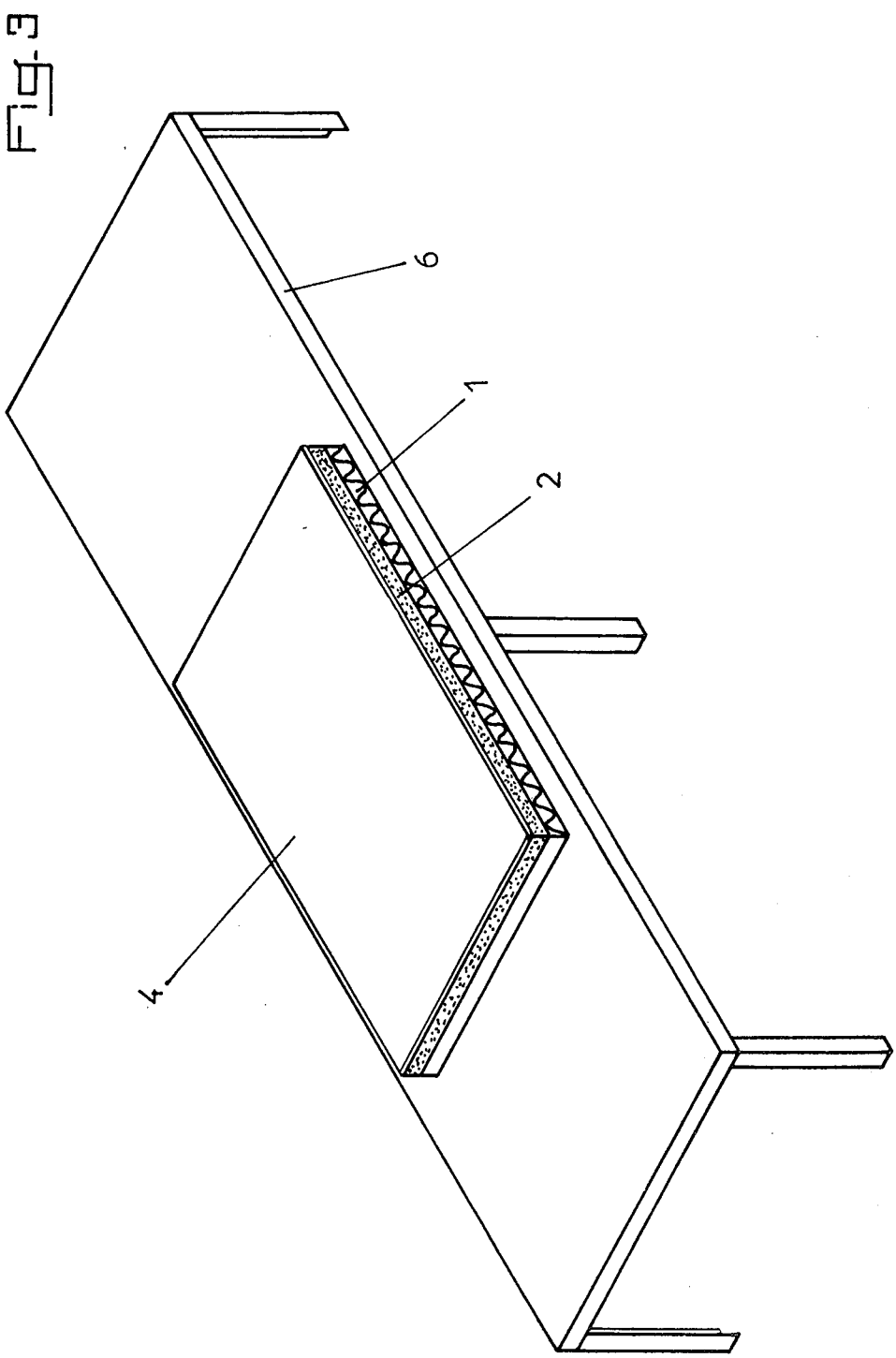

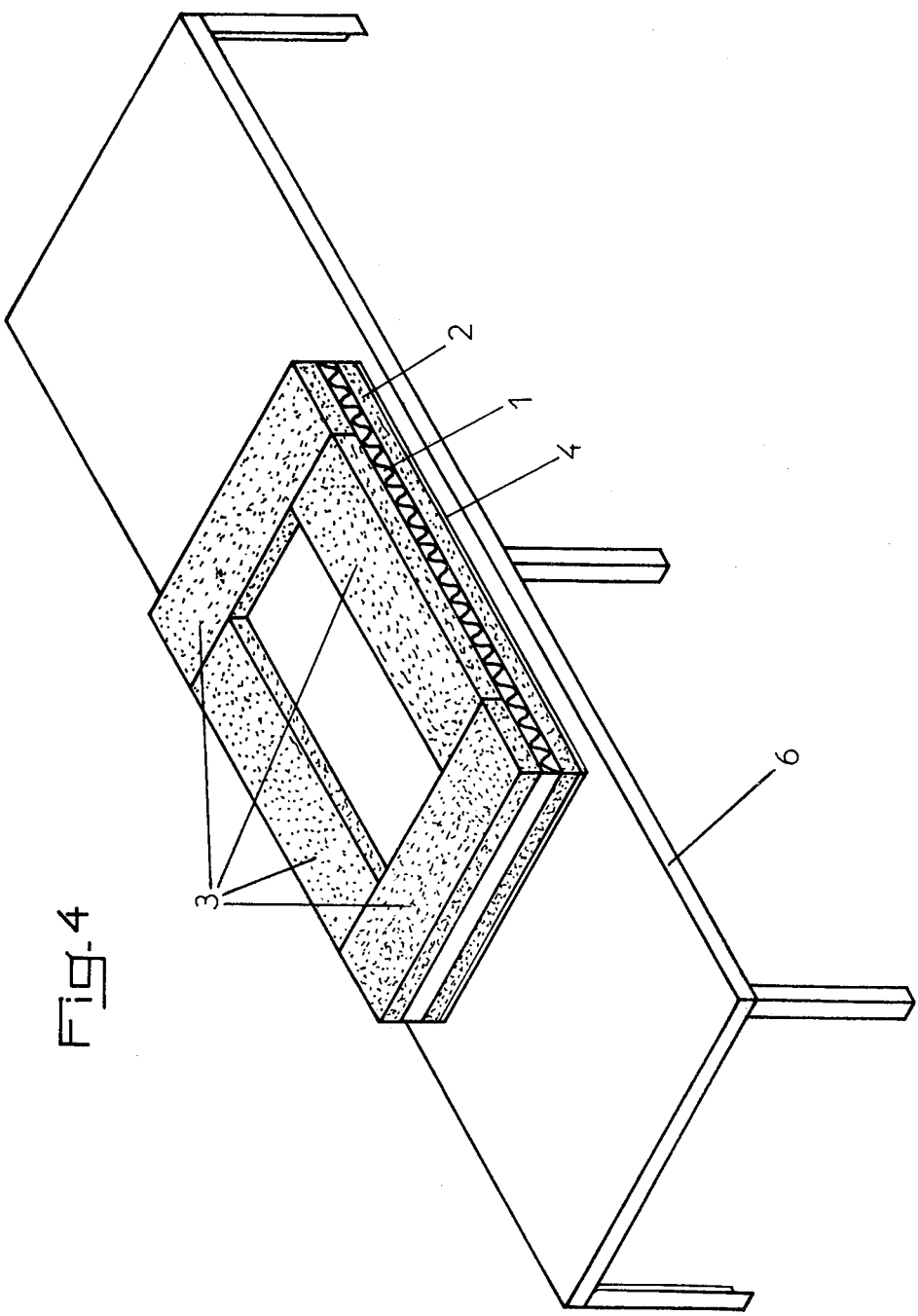

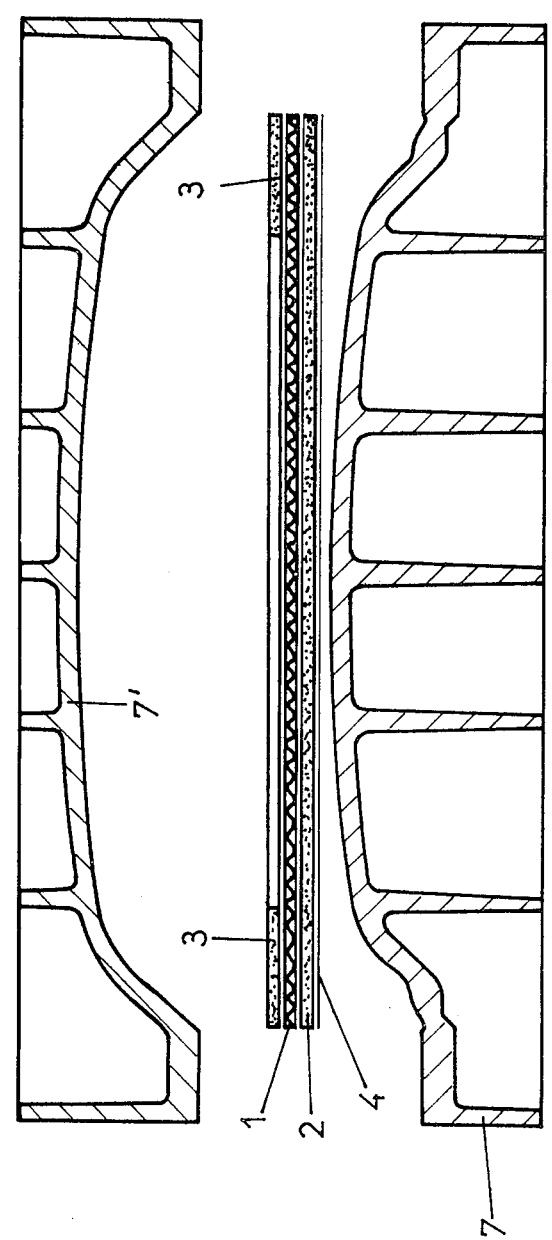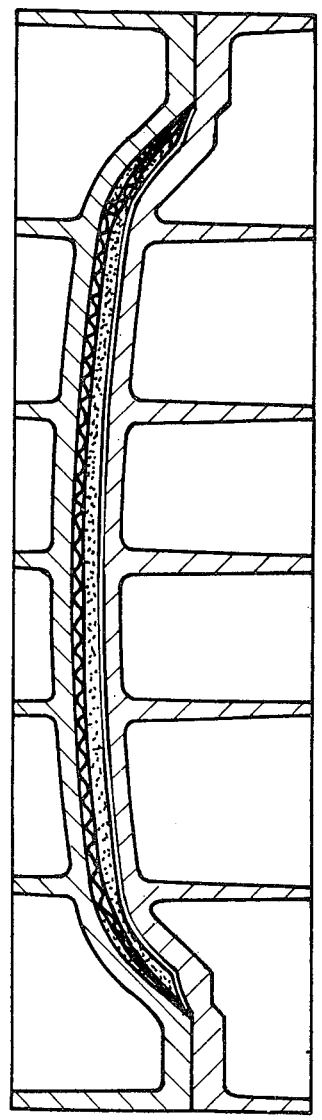

MOULDED LIGHT-WEIGHT FRAMED PANEL

This is a division of application Ser. No. 650,983, filed Jan. 21, 1976, now U.S. Pat. No. 4,059,660.

INTRODUCTION AND BACKGROUND OF THE INVENTION

The present invention has as one object to provide a method permitting the manufacture of moulded panels on a basis of cardboard united with a foamed material by means of an elastomer, as well as panels manufactured according to this method.

Years of researches into the manufacture of moulded paddings covered at the time of their manufacture with a finishing material and intended to be utilised as wall linings, false ceilings, or partitions or linings in automobiles etc. have made it possible to effect and industrialise various methods up to the present day.

According to one known method a film of polyvinyl chloride or a fabric rendered fluid-tight is applied with the aid of vacuum in the lower part of a mould, and into this is cast a foaming mixture of polyurethane which, after expansion and polymerisation in the closed mould, makes it possible to obtain a panel which is supple or semi-rigid or rigid according to the mixture which is utilised.

Such panels have besides the disadvantage of being relatively onerous in manufacture a high weight and they do not present sufficient stability against the effects of temperature.

A further object of the invention is to obviate or mitigate such disadvantages by making it possible to effect a method of manufacturing moulded panels allowing formation under pressure in a mould of cardboard, particularly of corrugated cardboard, while uniting it for example with the foamed material and an elastomer of polyurethane.

BRIEF SUMMARY OF THE INVENTION

According to the invention there is employed a method of manufacturing a moulded panel, characterised in that it comprises the steps of:

(i) wetting one of the surfaces of a sheet of cardboard with a solution of polymerisable elastomer,
(ii) wetting one of the surfaces of a sheet of foamed material with a solution of polymerisable elastomer,
(iii) placing the non-wetted surface of the sheet of foamed material upon the wetted surface of the sheet of cardboard,
(iv) placing a finishing cover material upon the wetted surface of the foamed material,
(v) turning over the sandwich thus formed and then wetting the virgin surface of the sheet of cardboard with more of the solution of elastomer,
(vi) disposing upon this last-mentioned surface after thus wetting it at least one strip or layer of foamed material,
(vii) placing the resulting assemblage into a mould for shaping the assemblage into a panel of the desired form, and
(viii) allowing polymerisation of the elastomer in the assemblage to proceed at least far enough to ensure that the panel will retain the said desired form and then removing the panel from the mould.

The cardboard is preferably corrugated cardboard of the type with two smooth surfaces, but it is equally possible to utilise corrugated cardboard of the type with one smooth surface, particularly if a sheet of kraft paper or other strong paper is incorporated in the panel.

The invention further comprises the provision of a panel including in combination a sheet of cardboard forming the basis of the panel, at least one sheet and at least one other portion of foamed material serving for padding and filling-out and strengthening of any folds or tears of the cardboard arising because of the placing and shaping in the mould, a finishing cover sheet material, and elastomer applied in fluid form and polymerised to ensure simultaneously the intimate joining together of the components of the panel, the stiffening (after the polymerisation of the elastomer) or the foamed material and the cardboard, especially at those places weakened during the placing in the mould, and the intimate application of the sheet of impregnated foamed material provided with the finishing cover sheet material to the surface of the mould.

FURTHER DESCRIPTION AND ADVANTAGES OF THE INVENTION

Panels made according to the method of the invention present, largely owing to the manner of utilising the said cardboard, a high degree of lightness (about 700 grams per square meter), a very substantial stiffness, and a very good stability against the effects of temperature. Moreover they are of a very low cost of production.

Tests have shown that when applying to a panel of size one meter by 1.50 meters made according to the invention and resting upon two supports spaced one meter apart in the longitudinal direction a bending load of two kilograms, the deflection which results does not exceed 15 mm as compared with a deflection of 30 mm to 50 mm which occurs with panels made according to the previously known method and subjected to the same test conditions.

It may well be noted here that the moulding of corrugated cardboard is scarcely practicable on account of its structure which confers its stiffness and resistance to deformation. In practice when a panel of corrugated cardboard is deformed by pressure the flutings are crushed and folds are induced in such a manner that at these stressed places the panel loses all its mechanical characteristics. Likewise the shape given to the moulding of such a panel is not in any way permanent, since the cardboard of which the fluting is crushed has lost its stability and therefore no longer retains the given shape.

The method which is the subject of the present invention, however, exactly makes it possible to overcome these disadvantages of the said cardboard and to make possible its shaping in a mould whilst simultaneously improving the stability of the finished panel.

The following description relates by way of example to a method of manufacturing a moulded panel representing a roof lining or partition of an automobile, the panel being provided with an ornamental finish on its concave surface and presenting a margin of small thickness all along its periphery, and explained with reference to the accompanying drawings.

BRIEF DESCRIPTION OF THE VIEWS IN THE DRAWINGS

In the accompanying drawings:

FIG. 1 represents a view in section of a completed panel in conformity with the invention, FIGS. 2 to 6 represent in schematic views various stages in the method of manufacture of the panel of FIG. 1, and FIG. 7 represents a modified panel in longitudinal section.

DETAILED DESCRIPTION OF THE PREFERRED EMBODIMENTS

As shown in FIG. 1 the illustrated panel which is the subject of the invention comprises a sheet 1 of corrugated cardboard of the type having two smooth surfaces, constituting the basis of the panel and conferring upon it the major part of its stiffness. The panel further comprises a sheet 2 and strips 3 of foamed polyurethane serving for the padding of the corrugated cardboard as well as for the filling out of holes and for the reinforcement of folds and tears induced by placing the cardboard in a mould. The panel further comprises a finishing cover sheet 4 and a solution of polyurethane elastomer which on the one hand ensures the intimate joining together of the various components of the panel, and on the other hand after polymerisation ensures the stiffening of the foamed polyurethane as well as of the corrugated cardboard, both by its inherent effect of constituting a film of elastomer which is reinforcing and by chemical reaction with the cardboard, according to which the NCO radicals of the diphenylmethane diisocyanate (MDI) contained in the mixture of polyurethane elastomer react with the free OH radicals contained in the cellulose of the cardboard in order by polycondensation to form stable chemical combination leading to a stiffening of the cardboard, and finally a very good taking of the impression by the foamed material impregnated with elastomer in the internal parts of the mould so as after polymerisation to match and preserve the shapes and reliefs.

By way of non-limitative example the solution of elastomer may comprise polyurethane and is preferably constituted by:

- 100 parts of polyol of the triol or quadrol type
- 85 parts of isocyanate of the methyl-phenyl-diisocyanate type (MDI)
- 0.05 to 0.10 parts of a catalyst (for example an organic salt of tin, such as tin octoate or lead naphthenate)
- 5 to 20 parts of solvent, for example trichlorofluoromethane ("Freon 11") or methylene chloride.

The solvent serves to dilute the solution in order to facilitate its application by spraying devices or by a brush, or by an impregnating roller, and to assist the penetration of the solution into the cardboard and foamed material.

In order to manufacture a panel such as described above, it is possible to proceed in the following manner of putting the invention into practice, described now by way of example.

By means of spraying devices 5 a solution of polyurethane elastomer is sprinkled onto the sheet of cardboard 1 and the sheet of foamed polyurethane placed upon a table 6 (FIG. 2).

The sheet of foamed material 2 is then placed upon the cardboard 1, in such a manner that the surface of the foamed material which is not sprinkled with the solution of polyurethane comes into contact with the sprinkled surface of the cardboard, while upon the sprinkled surface of the foamed material there is placed a foil or film or sheet of finishing cover material 4 (FIG. 3). It will be understood that it is equally possible, in order to improve the quality and increase the strength of the panel, to sprinkle both surfaces of the sheet of foamed material 2. Next the sandwich thus obtained is inverted in such a way that there is now uppermost the virgin surface of the cardboard, which during the following operation is sprinkled either over the entire surface or only over certain portions of this surface with polyurethane solution. Upon this surface there are then placed four strips 3 of foamed polyurethane serving to reinforce the cardboard on the said surface (FIG. 4). Naturally it is also possible to cover the entire surface of the cardboard with a single blanket or sheet of foamed material. As previously, solution of polyurethane will be sprinkled either upon the two surfaces of each of the strips 3 and the surface of the cardboard, or upon only a portion of these surfaces, in each case according to the degree of impregnation and hence the strength which is desired.

By way of example, the quantity of solution of polyurethane elastomer applied may vary from 50 grams per square meter for a low-cost product up to 500 grams per square meter for a product of high quality, a quantity of 100 to 200 grams per square meter representing a suitable intermediate amount. The sandwich which is thus obtained and which can be manipulated without special precautions because its various components adhere to each other either by capillarity and by reason of their extreme lightness or by the elastomer having attained a state of stickiness is next disposed upon a lower part 7 of a mould (FIG. 5). The state of stickiness can be obtained more rapidly by heating.

By closing the cover 7' of this mould there is effected some crushing of the said sandwich, thereby causing foldings and deformations of the flutings of the corrugated cardboard, but also simultaneously the filling-out and the reinforcement of these damaged areas by the foamed polyurethane and the solution of elastomer (FIG. 6).

As soon as the polymerisation of the polyurethane elastomer is achieved, which can be within a period reduced to the order of 3 or 4 minutes by heating the mould to 100° C., the cover 7' of the mold is raised and the completed panel is removed from the mould with all the components of the panel intimately joined to one another.

Due to the utilisation of this method all the impaired and/or weakened portions of the corrugated cardboard have been filled up and strengthened by the foamed material impregnated with polyurethane elastomer and also by the elastomer applied to the cardboard, the action of the elastomer having stiffened the cardboard as well as the foamed material. Moreover, on account of the characteristics of the foamed material and the elastomer, intimately matching the internal shape of the mould, it is possible with the aid of the method forming the subject of the invention to reproduce exactly upon the panel the shapes and reliefs provided in the mould.

According to a modified method the panel can be provided during its manufacture with inserts, for example in the form of reinforcing metal sheets and/or fixing elements serving for the fixing of the panel upon a support. These inserts may, for example, be fixing elements on the cardboard and/or placed between the sheet of cardboard 1 and the sheet of foamed material 2 or the strips 3 of foam polyurethane, and in the case of fixing elements the latter may project from the margins serving for securing them.

In conformity with a further modification the method comprises essentially the step of impregnating with polyurethane elastomer or the like the smooth surface of a sheet of corrugated cardboard having one smooth surface and also one surface of a sheet of kraft or other strong paper or the like, as well as one surface of a sheet of foamed material. There now follow successively the steps of sticking the coated surface of the sheet of paper upon the flutings of the sheet of cardboard, sticking the uncoated surface of the sheet of foamed material upon the coated surface of the sheet of cardboard, and sticking the sheet of covering material or fabric upon the coated surface of the sheet of foamed material. Then the sandwich thus obtained is inverted and placed in a mould, in which by the closing of the mould cover there is effected the compression of the panel together with its shaping and the polymerisation of the elastomer therein.

As shown in FIG. 7, the panel obtained by using the last described modified method consists essentially of a sheet 8 of kraft paper or the like, a sheet of corrugated cardboard of the kind having one smooth surface 9, a sheet of foamed material 10, a finishing cover material 11 which may be fabric or the like, and a solution of polyurethane elastomer which joins together all the various components.

During the operation of shaping the panel and polymerisation of the elastomer the sheet of paper 8 impregnated upon one of its surfaces with polyurethane elastomer is strongly pressed with this surface against the flutings of the cardboard 9. From this procedure, when the elastomer of polyurethane or the like is polymerised, there is realised a perfect unification of the cardboard 9 and the paper 8 of which the quality is superior to that of the existing corrugated cardboards having two smooth surfaces from the fact that the joining of one of the surfaces of the paper with the flutings is effected by the elastomer of polyurethane or the like.

At its margins 12 the panel of the invention has been reduced in thickness to several tenths of a millimeter over a width of 2 to 3 millimeters, and a prefect solidification of the components is obtained because of the impregnation and then the polymerisation under high pressure of the polyurethane elastomer. Thus any risk of gaping or coming apart of the margins, as a consequence of wide variations of temperature or humidity or of careless handling, is substantially precluded. Moreover, from the fact that the compressed margins are given perfect adherence by the against the infiltration of moisture, besides permitting a good finish of the panel.

By virtue of the invention it is possible to manufacture a shaped or moulded panel of substantial stiffness, because the corrugated cardboard forming the basis of the panel and obtained by unification of a cardboard having one smooth surface with a sheet of kraft paper by means of polyurethane elastomer has a quality very superior to that of conventional corrugated cardboard, on the one hand because the polyurethane elastomer confers upon the cardboard thus obtained a very high resistance to moisture and temperature, contrary to adhesive on a starch basis with which the risk of separation of the cardboard frequently arises, and, on the other hand, because the polyurethane elastomer confers great stiffness upon the corrugated cardboard due in particular to the chemical reaction according to which the NCO radicals of diphenylmethane diisocyanate contained in the mixture of polyurethane elastomer react with the free OH radicals contained in the cellulose of the cardboard or of the paper in order by polycondensation to form stable chemical compounds.

It will be well understood that the invention is not limited to the manner of putting it into effect as described above with reference to and illustrated by the accompanying drawings. Modifications remain possible, particularly with regard to the constitution of the panel, of which the corrugated cardboard can be replaced by plain cardboard which can equally well be preliminarily moistened at the portions to be stressed, particularly with slightly soapy water, and which can be provided upon its two surfaces with a covering of fabric or the like and/or a sheet of foamed material, without departing from the scope of the invention as defined in the following claims.

What is claimed is:
1. A molded panel comprising in combination a sheet of corrugated cardboard, a sheet of polyurethane foam disposed on one side of said sheet of cardboard, a finishing cover sheet disposed on the side of said foam sheet which is opposite said cardboard, further polyurethane foam disposed on at least the marginal portions of said cardboard sheet on the side of said cardboard sheet opposite said foam sheet, and in-situ polymerized polyol and isocyanate securing said cover sheet and said foam sheet together and securing said foam sheet and said corrugated cardboard sheet together and securing said further foam and said corrugated cardboard sheet together, said panel being curved in the vicinity of said further foam.
2. A panel according to claim 1, in which said cardboard has two smooth surfaces.
3. A panel as claimed in claim 1, and fastening elements held between the cardboard and the foam and projecting from the margins of the panel to serve for fixing the panel.

* * * * *